(12) United States Patent
Warrier et al.

(10) Patent No.: US 7,977,004 B2
(45) Date of Patent: Jul. 12, 2011

(54) COMPLIANT SEALS FOR SOLID OXIDE FUEL CELL STACK

(75) Inventors: Sunil G. Warrier, Middletown, CT (US); Jean Yamanis, Glastonbury, CT (US); Sonia Tulyani, Manchester, CT (US); Raymond C. Benn, Madison, CT (US)

(73) Assignee: UTC Fuel Cells, LLC., South Windsor, CT (US)

( * ) Notice: Subject to any disclaimer, the term of this patent is extended or adjusted under 35 U.S.C. 154(b) by 765 days.

(21) Appl. No.: 10/622,881

(22) Filed: Jul. 18, 2003

(65) Prior Publication Data

US 2004/0151968 A1  Aug. 5, 2004

Related U.S. Application Data

(60) Provisional application No. 60/444,025, filed on Jan. 31, 2003, provisional application No. 60/454,899, filed on Mar. 14, 2003.

(51) Int. Cl.
*H01M 2/08* (2006.01)

(52) U.S. Cl. .................. 429/465; 429/463; 429/509

(58) Field of Classification Search .................. 429/16, 429/30, 32, 34, 35, 36, 37, 38, 39, 44, 186, 429/204, 166, 207, 219
See application file for complete search history.

(56) References Cited

U.S. PATENT DOCUMENTS

| | | | | |
|---|---|---|---|---|
| 4,640,875 A | * | 2/1987 | Makiel | 429/30 |
| 5,460,897 A | | 10/1995 | Gibson et al. | |
| 6,074,771 A | * | 6/2000 | Cubukcu et al. | 429/30 |
| 6,139,810 A | * | 10/2000 | Gottzmann et al. | 422/197 |
| 2003/0215689 A1 | * | 11/2003 | Keegan | 429/35 |
| 2004/0200187 A1 | | 10/2004 | Warrier et al. | |

FOREIGN PATENT DOCUMENTS

JP  09082346  3/1997

* cited by examiner

*Primary Examiner* — R. Hodge
(74) *Attorney, Agent, or Firm* — Bachman & LaPointe, P.C.

(57) ABSTRACT

A seal assembly for a solid oxide fuel cell stack, includes at least two fuel cell stack components having opposed surfaces and a seal member disposed between the surfaces, wherein the seal member is a compliant seal member that is mechanically compliant in both in-plane and out-of-plane directions relative to the surfaces. The seal member is advantageously formed of one or more substantially continuous fibers. Further, preferred materials for the seal member are provided which advantageously allow for a desired level of impermeability while preventing contamination of the fuel cell stack.

14 Claims, 4 Drawing Sheets

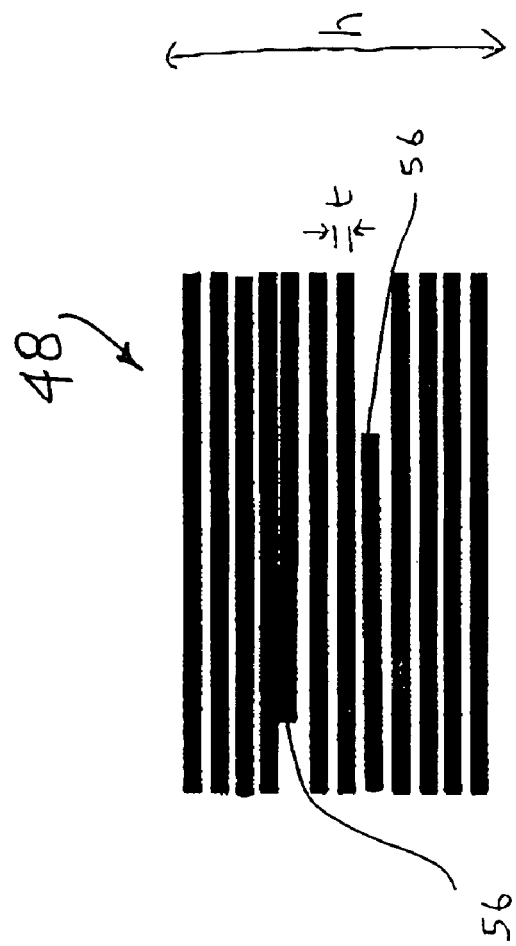
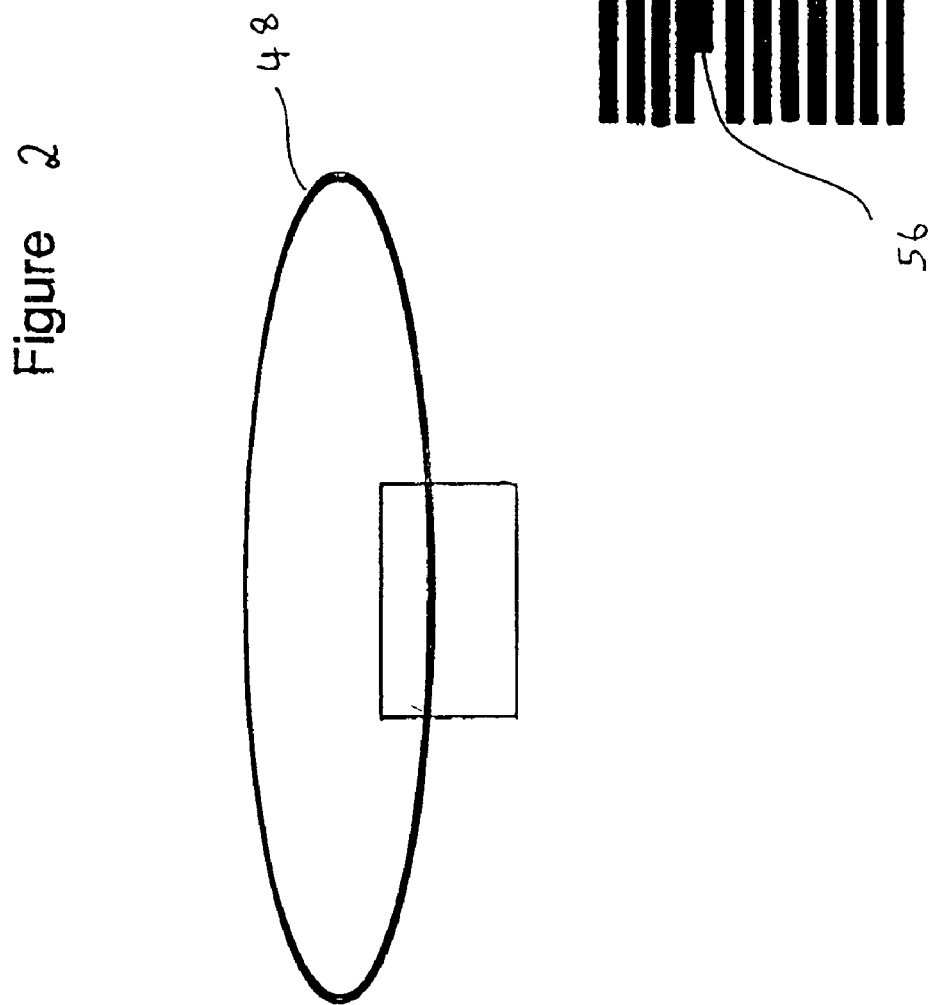

COMPLIANT SEALS FOR SOLID OXIDE FUEL CELL STACK

CROSS REFERENCE TO RELATED APPLICATIONS

This application claims priority to U.S. provisional Application No. 60/444,025, filed Jan. 31, 2003, and U.S. provisional Application No. 60/454,899, filed Mar. 14, 2003.

BACKGROUND OF THE INVENTION

The invention relates to solid oxide fuel cell (SOFC) stacks and, more particularly, to a compliant seal for positioning between layers of components that form the stack.

The primary function of such seals is to prevent mixing of gaseous reactants used in an SOFC stack. In order for the seals to provide the desired function, it is necessary that the seals possess mechanical and chemical stability at high temperature and moist-reducing conditions present within an SOFC stack. In addition, the seals must maintain structural integrity under operation and thermal cycling conditions.

Conventional seals are made of glass or glass-based ceramics where the thermal expansion properties are tailored to match that of the cell and stack components such that the seals maintain structural integrity on thermal cycling. These glasses are typically made of oxides containing silicon, boron, or phosphorous and typically contain additions of alkali metal oxides. Unfortunately, these oxides tend to contaminate the cells and adversely affect the long-term performance of the cells and stack. In addition, these glasses are not chemically stable in moist-reducing environments and do not provide structural integrity for long-term applications.

Prior art seals for SOFC's also include the use of gaskets made of discontinuous ceramic fibers mixed with ceramic particles. Such seals leak and result in gas mixing, loss of efficiency and possible degradation of the cell performance.

Based upon the foregoing, it is clear that the need remains for an improved impermeable seal that does not contaminate or otherwise adversely affect cell performance and is chemically and mechanically stable under long-term operating and thermal cycling conditions.

It is therefore the primary object of the present invention to provide such a seal.

Other objects and advantages of the present invention will appear hereinbelow.

SUMMARY OF THE INVENTION

In accordance with the present invention, the foregoing objects and advantages have been readily attained.

According to the invention, a seal assembly for a solid oxide fuel cell stack is provided, which comprises at least two fuel cell stack components having opposed surfaces; and seal members disposed between said surfaces, wherein said seal members are mechanically compliant in both in-plane and out-of-plane directions, thereby providing relaxation to thermal expansion mismatch stresses as well as relaxing assembly and manufacturing tolerances of cell and other stack components, while maintaining high levels of gas impermeability. The in-plane directions are substantially parallel to the opposed surfaces, while the out-of-plane direction is substantially perpendicular to the opposed surfaces.

In further accordance with the invention, the seal member is preferably in the form of continuous fibers, which are arranged to form a continuous fiber seal. The continuous fiber seal is preferably formed into closed-loop rings or other closed-loop structures for providing desired gas impermeability while maintaining functionality of in-plane and out-of-plane compliance.

In further accordance with the invention, the said seal member comprises at least one material selected from the group consisting of oxide ceramics that are stable in both oxidizing and moist-reducing atmospheres, referred to herein as stable oxide ceramics.

In further accordance with the invention, the compliant continuous fiber seals are positioned between predetermined surface features of the sealing surfaces such that both in-plane and out-of-plane displacements of the fibers are advantageously controlled. Of particular importance are compression stops that are provided to control the extent of out-of-plane compliant seal deformation thereby advantageously limiting the amount of creep deformation of metallic interconnects.

In further accordance with the invention, the compliant continuous fiber seals are impregnated with metallic, ceramic or cermet impregnants to further increase the impermeability of the seals.

BRIEF DESCRIPTION OF THE DRAWINGS

A detailed description of preferred embodiments of the present invention follows, with reference to the attached drawings, wherein:

FIG. 2 illustrates a preferred embodiment of a compliant continuous fiber seal of the present invention;

FIG. 3 illustrates a magnified view of the preferred embodiment showing two fiber ends;

DETAILED DESCRIPTION

The invention relates to fuel cells generally, especially solid oxide fuel cells (SOFC) and, more particularly, to a seal assembly for positioning between layers of a solid oxide fuel cell stack which provides a suitable seal against leakage of gases between layers while avoiding contamination of the stack and advantageously providing mechanical compliance in both in-plane and out-of-plane directions, thereby providing relaxation to thermal expansion mismatch stresses as well as relaxing assembly and manufacturing tolerances of cell and other stack components. The discussion herein relates to SOFC's, but one of ordinary skill in the art will recognize that the invention could be applied to other types of fuel cells that would benefit from such technology, such as molten carbonate fuel cells or other fuel cells.

According to the invention, a seal assembly for a solid oxide fuel cell stack is provided, which comprises at least two fuel cell stack components having opposed surfaces; and a seal member disposed between said surfaces. The seal member is advantageously provided of a material which is selected from the group consisting of oxide ceramics that are stable in both oxidizing and reducing atmospheres, which materials are referred to herein as stable oxide ceramics.

In accordance with a further aspect of the invention, the seal member is provided in the form of continuous fibers, which are arranged to form a continuous fiber seal. The continuous fiber seal is preferably formed into closed-loop rings or other closed-loop structures for providing desired gas impermeability and the like. The term closed-loop is defined as a fiber or a bundle of fibers called tow, wound to form an "O-Ring"-like structure that has only two free fiber or tow ends. The discontinuity introduced by the fiber free ends becomes insignificant as the number of loops of either fiber or tow increases, resulting in increased gas impermeability.

Figure 1:
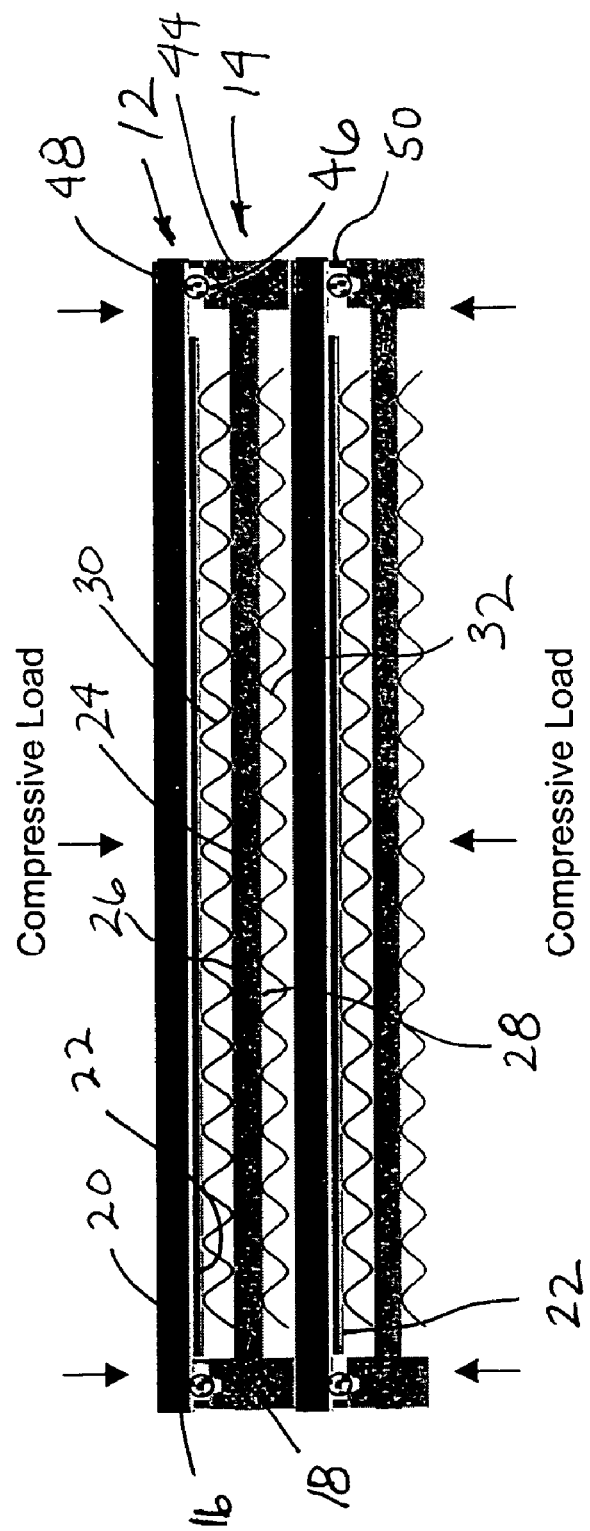
FIG. 1 schematically illustrates fuel cell stack including a seal assembly in accordance with the present invention.

FIG. 1 schematically illustrates a fuel cell stack assembly 10 in accordance with the present invention. Assembly 10 preferably includes a plurality of fuel cells 12 arranged in a stack with bipolar plates 14 positioned therebetween.

Fuel cells 12 typically include an electrolyte 16, a cathode layer 18 positioned on one side of electrolyte 16, and an anode layer 20 positioned on the other side of electrolyte 16, and layers 22 on either sides.

Bipolar plate 14 includes a separator plate 24 having a cathode facing surface 26 and an anode facing surface 28, a cathode interconnect 30 positioned between cathode facing surface 26 and a cathode layer 18 of an adjacent fuel cell 12, and an anode interconnect 32 positioned between anode facing surface 28 and an anode layer 20 of an adjacent fuel cell 12.

In accordance with the present invention, the seal design is provided in the form of a frame 44 defining therein an optional groove 46, and a compliant seal member 48 positioned in groove 46 and compressed between separator plate 24 and adjacent fuel cells 12 to provide the desired seal therebetween. A compression stop 50 is provided to limit the amount of deflection of the compliant seals and to advantageously assemble compliant interconnects, compliant seals and all other elements of the stack. One skilled in the art will recognize that a frame 44 is not required, as the compliant seal member 48 could be placed directly between the separator plate 24 and adjacent fuel cell 12, or between other fuel cell components as well. One skilled in the art will also recognize that the compression stop 50 is not required in the present invention, but that it provides additional benefits as described herein.

It should be appreciated that although the embodiment of FIG. 1 shows seal member 48 positioned between fuel cell 12 and separator plate 24, thus sealing the cathode side; seal member 48 in accordance with the present invention, and the associated seal assembly, could likewise be positioned to seal the anode side and between other fuel cell stack components as well and as needed or desired.

In further accordance with the present invention, the seal member 48 can advantageously be provided from select materials, which allow for effective sealing without contamination of the fuel cell stack. In accordance with the present invention, seal member 48 can advantageously be provided from a material set comprising at least one stable oxide ceramic such as alumina, zirconia, mullite, yttrium aluminum garnate, magnesium silicate and the like. Seal member 48 is preferably provided as a continuous fiber seal structure. Commercially available fiber material products that can be used for the seal include Nextel™ 610, Nextel™ 312, Nextel™ 440, Nextel™ 550, Nextel™ 720 from 3M and the like, as non-limiting examples.

As set forth above, seal member 48 is advantageously provided in the form of continuous fibers, preferably continuous alumina fibers, which exhibit substantial mechanical compliance while maintaining high levels of impermeability.

FIG. 2 shows one arrangement of seal member 48 where the continuous fibers are wound into a closed-loop structure such as a ring, wherein the ring may consist of one loop of a fiber bundle or a plurality of continuous loops of individual fibers or small bundles of fibers. Continuous looping of individual fibers or small bundles of fibers advantageously provide for increased impermeability to gases since fiber ends are substantially minimized with continuous closed-loop seal structures. While the seal member 48 is disclosed as a ring in FIG. 2, one of ordinary skill in the art will recognize that other shapes of seal member 48 are possible and within the scope of the invention. For example, seal member 48 is preferably shaped to match the area desired to be sealed, such as that defined by the groove 46 of FIG. 1.

FIG. 3 illustrates a magnified view of a portion of the closed-looped structure of FIG. 2 and shows ends 56 of the fiber or bundle of fibers. The preferred embodiment of the seal member 48 has a height "h" and is made up of "n" loops of fibers or bundles of fibers with a diameter "t", wherein "n" is equal to or greater than unity and the ratio of "h/t" is greater to or equal to unity. For a particular fiber or bundle of fibers, a larger number 'n' provides increased impermeability, as the number of loops increases in relation to the number of ends 56, which remains fixed. For example, if a single fiber were looped ten (10) times, there would be ten loops and two ends 56, for a loop/end ratio of 5:1. Impermeability could be increased by looping the fiber one hundred times, as the structure would then have one hundred loops and only two ends 56, for a loop/end ratio of 50:1.

Figure 4:
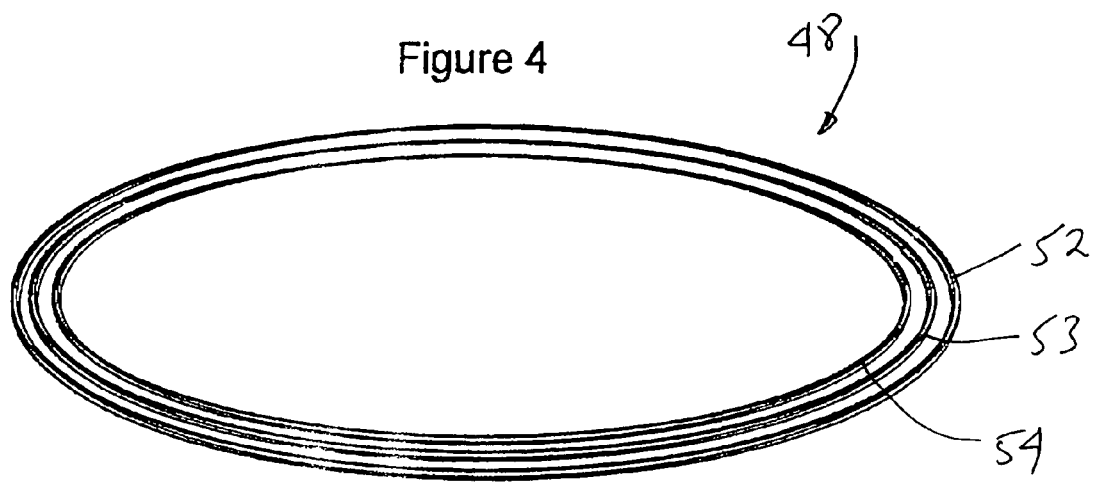
FIG. 4 illustrates a second preferred embodiment of a compliant continuous fiber seal of the present invention.

FIG. 4 shows another arrangement of seal member 48 where a plurality of continuously looped closed ring structures 52, 53, 54 made of continuous fibers are placed in substantially concentric pattern to provide for increased impermeability.

In another embodiment of this invention, the materials of the fiber seal in each of the concentric rings may be different. As one example, the inner ring or rings such as 54 on the anode side of the seal may be made of a material that is stable in only a reducing environment, such as graphite fibers, and the inside ring or layers of the cathode side of the seal may be made of a material that is stable in only an oxidizing environment, such as silica.

Figure 5:
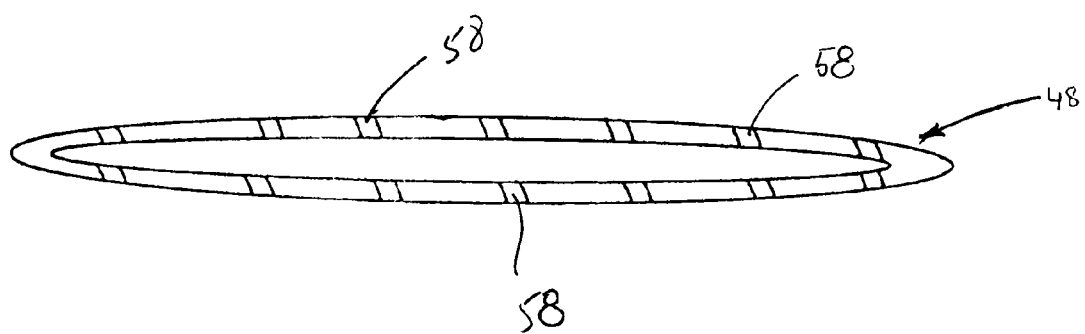
FIG. 5 illustrates a third preferred embodiment of the arrangement of a compliant continuous fiber seal of the present invention.

FIG. 5 shows another arrangement of the fibers, wherein the fibers or bundles of fibers are formed into a closed-loop and the ending lengths 58 of fiber are used to further wind over or around the closed-loop structure to provide a handleable "O-ring" like seal structure.

In another embodiment of the invention, seal member 48 can advantageously be provided having other continuous fiber architecture such as braids, yarns and weaves or the like.

In another embodiment of the invention, the continuously looped fibers can be impregnated with secondary particles and gels such as ceramics and metals which can be disposed within the fibers so as to further increase the impermeability of the seal. The volume fraction of the impregnants may range from between about 0.1% and about 50% and the shape of the particles may be spherical, platelet shaped, acicular, or even irregular.

Impregnants may comprise one or more of a set of metals and alloys consisting of Ni, Cr, Cu, Ag, Fe, Al, and combinations thereof. Some of these impregnants may be treated in a preferred environment to form oxides, nitrides, etc. to improve the impermeability of the seal. Some of these metals may undergo volumetric expansion through oxidation, nitridation, etc. to improve the impermeability of the seals.

In another embodiment of the present invention, ceramic particles such as alumina, zirconia, mullite, yttrium aluminum garnate, and other oxides may be used to impregnate the fiber bundle to improve the impermeability of the seal.

In yet another embodiment of the present invention, $Ag_2O$ or other oxides that can be decomposed to the metallic state may be used to impregnate the fiber bundle to improve the impermeability of the seal. One of ordinary skill in the art will recognize that many sizes, materials, volume fractions, shapes, etc. of impregnants are possible and are within the scope of the invention.

Referring again to FIG. 1, in accordance with the present invention, separator plate 24 can advantageously be provided having a frame 44 upon which opposed surface 60 is defined, and frame 44 preferably further has a groove 46 defined therein for receiving seal member 48.

Figure 6:
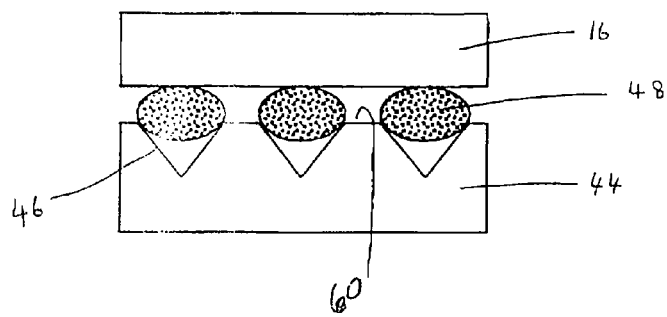
FIG. 6 illustrates a preferred embodiment of the arrangement of a compliant continuous fiber seal using flat surfaces in accordance with the present invention.
Figure 7:
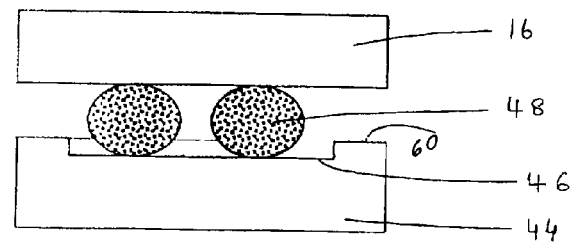
FIG. 7 illustrates a second preferred embodiment of the arrangement of a compliant continuous fiber seal using shallow grooved surfaces in accordance with the present invention.
Figure 8:
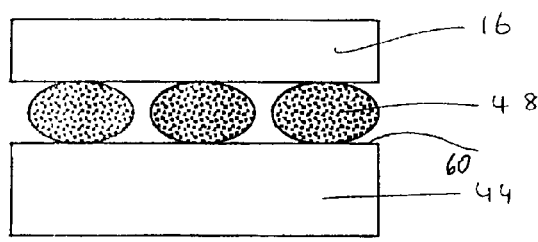
FIG. 8 illustrates another preferred embodiment of the arrangement of a compliant continuous fiber seal using "V" grooved surfaces in accordance with the present invention.

FIG. 6 illustrates one such arrangement using a "V"-groove. FIG. 7 illustrates another such arrangement using a shallow groove 46. FIG. 8 illustrates a third arrangement without a groove. Grooves 46 such as those disclosed in FIGS. 6 and 7 can provide improved sealing when the seal is under compression, as the seal will deform under the load based on the shape of the groove, magnitude of load, etc., and potentially achieve a better seal. In addition, grooves 46 help to keep the seal in place during assembly and operation.

Figure 9:
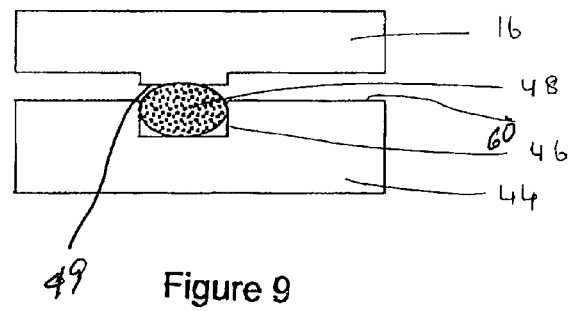
FIG. 9 illustrates yet another preferred embodiment of the arrangement of a compliant continuous fiber seal using inverted grooved surfaces in accordance with the present invention.

FIG. 9 illustrates another such arrangement using a reverse groove, wherein the seal member is advantageously compressed into the groove using a reverse groove 49, on the component case surface opposed to groove 46, in this case provided on the surface of the fuel cell 12 to increase impermeability.

In further accordance with the present invention, the bipolar plate contains compliant interconnects 30 and 32, as schematically illustrated in FIG. 1, and along with the compliant seal member 48, frame 44, and compression stop 50, out-of-plane inconsistencies in components such as fuel cell 12 and bipolar plate 14 can be tolerated. The combination of compliant interconnects 30, 32 and compliant seal member 48 thus allows for greater engineering tolerance during manufacturing and assembly procedures. Further, the provision of fixed thickness frames 44 and compression stop 50 ensures decoupling of the sealing and interconnection compliance requirements by advantageously controlling the amount of seal and interconnect deformation, and therefore provides substantial flexibility for building stacks that are based upon stable and compatible materials.

The compression stops 50 limit the extent of deformation of the interconnect 30 (or 32) as the stack is being compressed, thereby reducing the interconnect creep driving force and improving the long-term durability of the stack.

Compression stops 50 are preferably rigid and smaller in thickness than the initial height of the seal member 48, and allow for the seal member 48 to compress initially and subsequently cause the seal compression to come to a stop. Interconnect creep driving force is reduced because much of the compression force on the stack assembly 10 is carried by the compression stop 50. Typical thickness of the compression stop 50 is in the range of 0.01 mm to 10 mm. Compression stops 50 may be made of plates, etc. of stable ceramic materials such as alumina or can be machined as an integral part of the metallic frame. One of ordinary skill in the art will recognize that other designs, shapes, materials, etc. for the compression stop 50 are possible and within the scope of the invention.

Seal assemblies in accordance with the present invention have been found to advantageously allow for in-plane stress relaxation, which promotes thermal cycling tolerance without sacrificing the sealing capability. Further, in accordance with the embodiments of the present invention wherein glasses are avoided, contamination of the fuel cell is likewise avoided.

FIG. 1 shows a compressive load applied to the top and bottom of assembly 10, which compressive load is advantageously selected to provide for sufficient interconnect bonding and sufficiently reduced leakage in the seals while nevertheless allowing micro-sliding between adjacent components to relieve thermal mismatch stresses and to minimize compressive creep of the interconnects.

Seal members in accordance with the present invention further allow the use of a lower clamping load which further reduces the stresses to which components of the stack are subjected, and further allows for the desired in-plane sliding at the seal assembly, while maintaining a high level of impermeability.

It should also be appreciated that although FIG. 1 shows seal member 48 as a substantially round member, which would be elongated and disposed in groove 46, the seal could likewise be provided having a different shape such as elliptical, or the like, and different structure such as multiple labyrinth-type seals, which could include seal end caps, external manifold integration, and the like.

It should be appreciated that seals described in the inventions are not hermetic. Small amounts of gases are allowed to permeate through the seal. Such small leakage results in minimal gas mixing, negligible loss in efficiency and negligible degradation of cell performance.

In one example, five concentric closed-loop seals of Nextel™ 610 1500 Denier tow with perimeters of 16 cm, 19 cm, 20.3 cm, 24.3 cm and 26 cm were used to form a seal between two flat steel surfaces. At a flow rate of 0.5 l/min of He and a gas pressure of 1.5 kPa, a leak rate of less than 1.5 ml/min (or less than 0.3%) was achieved under a 3 MPa compressive load at room temperature. There was no increase in leak rate after ten thermal cycles from 20° C. to 800° C. at 10° C./min. Thus, the structure of the present invention advantageously provides excellent sealing under expected operating conditions.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A seal assembly for a solid oxide fuel cell stack, comprising:
    at least two fuel cells each comprising an electrolyte having a cathode layer on one side and an anode layer on the other side, and at least one bipolar plate between the at least two fuel cells, the at least two fuel cells and the bipolar plate collectively defining at least two fuel cell components having opposed surfaces; and
    a continuous fiber tow wrapped into a closed-loop structure forming a substantially gas impermeable seal between said opposed surfaces.

2. The apparatus according to claim 1, wherein said seal comprises a stable oxide ceramic.

3. The apparatus according to claim 1, wherein said seal comprises at least one material selected from the group consisting of alumina, magnesia, zirconia, mullite, yttrium aluminum garnate, magnesium silicate and combinations thereof.

4. The apparatus of claim 1, wherein said seal is impregnated with at least one metal selected from the group consisting of Ni, Cr, Ag, Cu, Fe, Al and combinations thereof.

5. The apparatus of claim 1, wherein said seal is impregnated with at least one material selected from the group consisting of alumina, zirconia, yttria aluminum garnate, magnesium silicate and combinations thereof.

6. The apparatus of claim 1, wherein said seal is impregnated with $Ag_2O$.

7. The apparatus of claim 1, wherein said seal comprises at least a first fiber in a substantially concentric relationship with a second fiber.

8. The apparatus of claim 7, wherein said at least two fuel cell components comprise a separator plate and a fuel cell with said seal disposed therebetween.

9. The apparatus of claim 1, further comprising a compression stop extending from at least one of said fuel cell components toward the other of said fuel cell components and defining thereon at least one of said opposed surfaces and having a groove for receiving said seal member.

10. The apparatus of claim 9, wherein said seal has a height and said groove has a depth, and wherein said height is greater than said depth whereby said seal in said groove can be compressed between said opposed surfaces.

11. A seal assembly for a solid oxide fuel cell stack, comprising:

at least two fuel cell components having opposed surfaces; and a seal member disposed between said surfaces, wherein said seal member comprises one or more substantially continuous fibers, and wherein said fibers are impregnated with $Ag_2O$.

12. A seal assembly for a solid oxide fuel cell stack, comprising:

at least two fuel cells each comprising an electrolyte having a cathode layer on one side and an anode layer on the other side, and at least one bipolar plate between the at least two fuel cells, the at least two fuel cells and the bipolar plate collectively defining at least two fuel cell components having opposed surfaces;

a continuous fiber tow wrapped into a closed-loop structure forming a substantially gas impermeable seal between said opposed surfaces; and a compression stop disposed between said opposed surfaces of said fuel cell stack components.

13. The apparatus of claim 12, further comprising a frame situated between said opposed surfaces, wherein said frame is located adjacent one opposed surface, and wherein said compression stop is disposed on said frame.

14. The apparatus of claim 12, wherein said opposed surfaces comprise substantially planar surfaces, and wherein said compression stop extends from one of said substantially planar surfaces toward the other of said substantially planar surfaces.

* * * * *